Dec. 13, 1949  J. I. YELLOTT  2,491,434
COMBINATION POWER PLANT AND HEATING SYSTEM
Filed April 25, 1947  2 Sheets-Sheet 1

INVENTOR.
JOHN I. YELLOTT
BY Frederick Griswold, Jr.
ATTORNEY

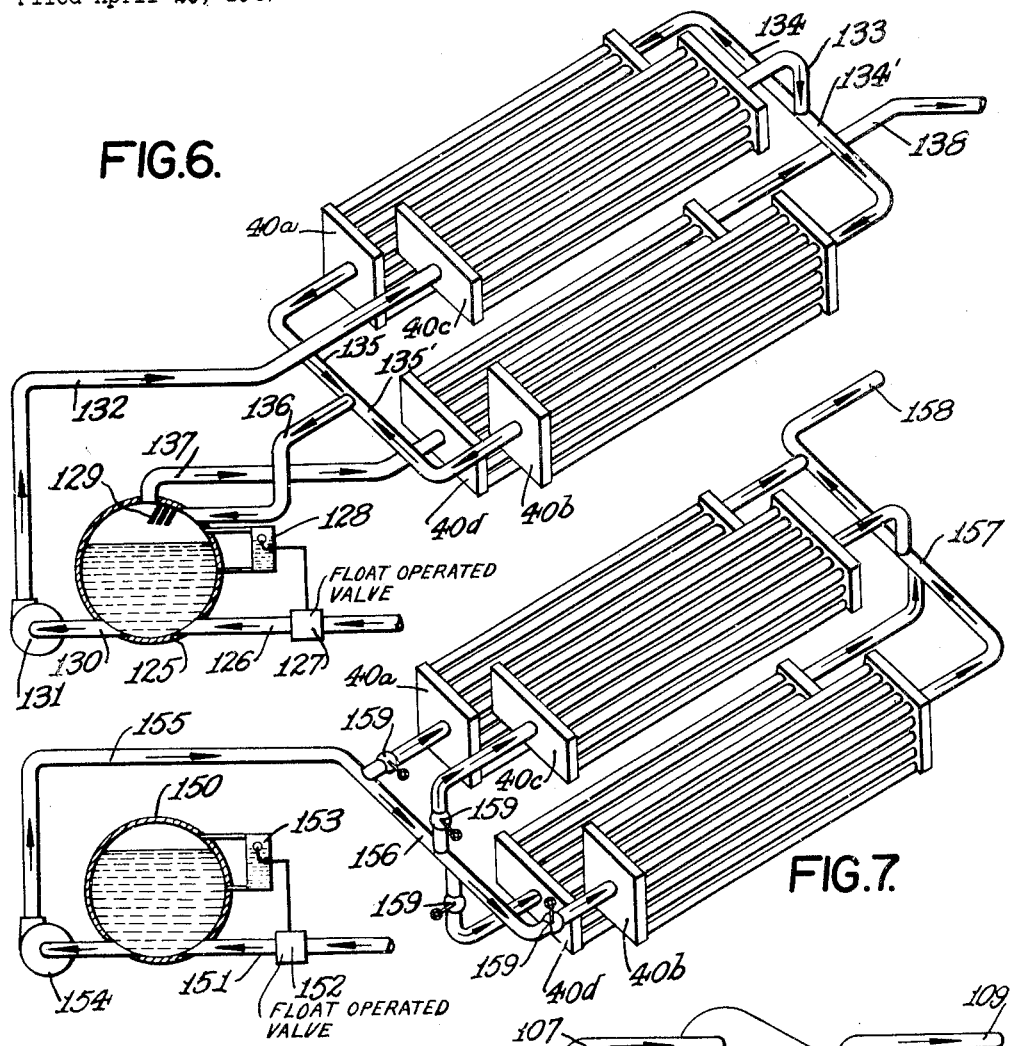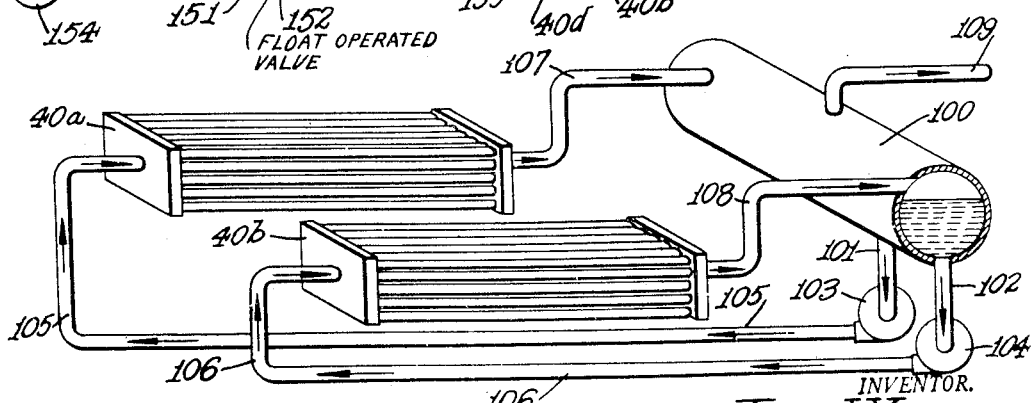

Patented Dec. 13, 1949

2,491,434

UNITED STATES PATENT OFFICE 2,491,434

COMBINATION POWER PLANT AND
HEATING SYSTEM

John I. Yellott, Cockeysville, Md., assignor to
Bituminous Coal Research, Inc., Washington,
D. C., a corporation of Delaware Application April 25, 1947, Serial No. 743,812

12 Claims. (Cl. 290—2)

This invention relates to improvements in combination power plants and auxiliary heating systems, and, more particularly, to an improved turbo-electric power unit powered by a coal-fired gas turbine.

The pressurized combustion of pulverized fuel, as a source of motive fluid for gas turbines, permits important savings to be made in operating costs and maintenance charges when compared with steam and Diesel electric plants. An important factor in the operation of a gas turbine is the enormous quantity of motive fluid, comprising combustion products and admixed auxiliary air, and/or steam, which is discharged, at relatively high temperatures. Upon exhausting of this fluid from the turbine casing an appreciable quantity of heat is lost. Thus, in a gas turbine in which the mixed motive fluid or gases are introduced into the turbine at inlet temperatures of the order of 1300° F., the temperature of the exit gases may be of the order of 700° to 900° F. In my prior application, Serial No. 691,307, filed August 17, 1946, I have shown the desirability of utilizing as much as possible of this waste heat for auxiliary heating services, such as train and hot water heating, and the like, when the power units are used in locomotives.

I have now found that the desirable efficiencies of a coal-fired gas turbine power plant may be considerably augmented and improved by incorporating auxiliary heater units in the exhaust stack of the gas turbine to withdraw the maximum possible quantity of sensible heat units from the exhaust gases and utilize the same for heating hot water and developing process steam or superheated steam. Such auxiliary systems will be of particular advantage in power units which are used in industrial plants and including chemical process plants. Also the power units herein are of great utility in apartment houses and office buildings where they serve to provide electricity for lighting and power, and also serve to generate hot water and steam for the building heating services. The incorporation of the auxiliary heating units in the main power plants to form a combination power plant and auxiliary heating system, is of particular importance, in view of the fact that gas turbine installations require no water for operation, and require a minimum of space, as well as a minimum of supervision and control. Under some circumstances it is comprehended that the addition of steam to the air or working fluid will enhance the efficiency of the system. Where the combustor or furnace unit is mounted in the exhaust stack, as is contemplated herein, and as is more fully described and claimed in my application Serial No. 746,817, filed May 8, 1947, for Self-contained gas-turbine system, a maximum utilization of the heat units developed in the combustion of the pulverized fuel is attained and the equipment is guarded against those temperature differentials which normally obtain in usual power plant equipment.

Among the features of novelty and advantage of the present invention are, therefore, the generation of electric or mechanical power, with a concomitant generation of heating steam and hot water, the heating steam being either wet or process steam, or superheated steam, and all by the use of waste heat from gas turbine installations, an exemplary form of which is illustrated in the accompanying drawings.

In the drawings, like numerals refer to similar parts throughout the several views, of which:

Fig. 5 is a schematic showing of the connections of the heater units of Fig. 3 with a steam boiler;

Fig. 6 is a schematic showing of the heater units of Fig. 4 connected with a boiler drum to deliver superheated steam; and Fig. 7 is a view similar to Fig. 6 showing the units connected to deliver hot water at a uniform temperature.

Figure 1:
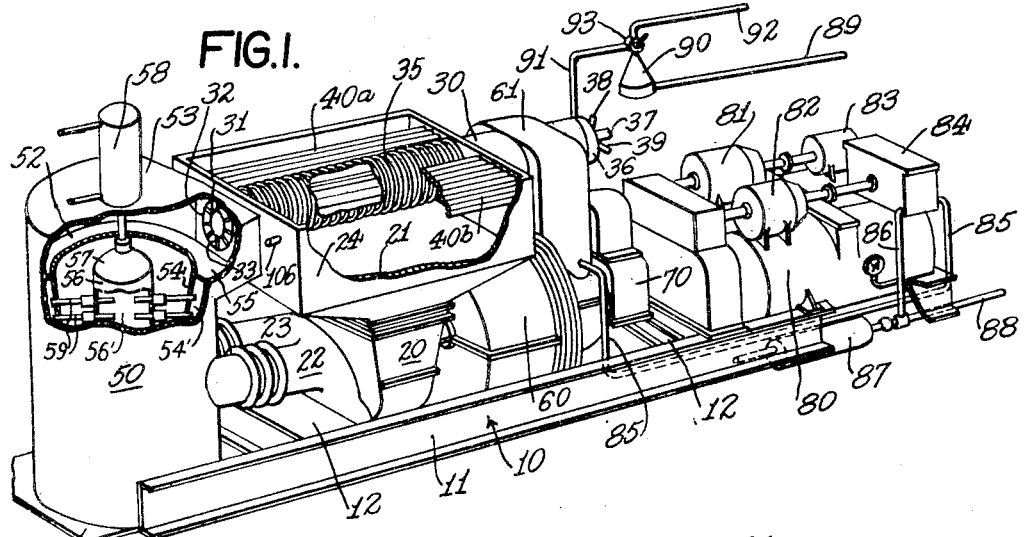
Fig. 1 is a perspective of a novel gas turbine power plant with the combustor and auxiliary heaters being shown in broken view.

The turbo-electric power unit forming the basic member of the composite power plant herein is illustrated in Fig. 1. As shown, the plant comprises a bed plate or base 10 of spaced parallel everted channels 11, secured by interposed cross bracing members, designated generally by the numeral 12. The power unit comprises a gas turbine 20, and generator 80, coupled to the turbine shaft through gear box 70.

Gas turbine 20 has an exhaust stack 21 in which is mounted a combustor 30 and two banks of heater tubes 40a and 40b, disposed on either side of the combustor unit. A pair of inlet ducts 22, 23, connect the turbine to a fly-ash separator 50. The separator 50 is mounted on a bed plate 51 secured between the framing members 11 of the unit. An air compressor 60 is mounted on the turbine shaft and discharges through duct 61 into the outer casing 32 (Figs. 3 and 4) of the combustor 30, and in heat-exchanging relation with the inner flame tube 31. The gear box 70 serves to couple the turbo-compressor shaft to the generator unit 80 mounting auxiliary generators 81, 82 thereon. The auxiliary generator 81 is desirably A. C. and is used for powering light systems, or for powering motors used for various purposes. A third auxiliary generator 83 may be mounted on the same shaft with generator 81, and will serve as an exciter for the field coils of main generator 80. Generator 82 will be A. C. wound, and its shaft is used to power the auxiliary high pressure air pump 84, which is desirably of the piston, or positive displacement type. The auxiliary high pressure compressor 84 is connected through line 85, as an input, to duct 61 comprising the discharge or pressure side of compressor 60.

The auxiliary high-pressure compressor 84 discharges through line 86 and a T connection to an auxiliary high pressure air tank 87 and a separate high pressure air line 88. The high pressure air line 88 will be conducted to a coal storage hopper, not shown, where it will pick up coal, in suitably comminuted condition, and the pressurized coal will be delivered through line 89 into the coal atomizer 90, thence through pipe or ducts 91 into the flame tubes 31 of the combustor 30. The specific details of the high pressure air pick-up of the comminuted coal from the storage hoppers are more particularly shown and claimed in my applications Serial No. 691,307, filed August 17, 1946, and Serial No. 763,850, filed July 6, 1947, for coal-fired gas turbine, and will not be described further herein. A by-pass pipe 92 is connected between the outlet side of the coal atomizer 90 and the coal hopper to permit the by-passing of the fuel around the combustor, should any such need arise. By-pass control 93 will comprise a two-way valve which will normally maintain pulverizer 90 and feed pipe 91 in connection. When it is desired to by-pass the pulverized coal from the pulverizer back to the storage hopper, the valve 93 will be operated to connect line 92 directly with chamber or pulverizer 90 and close off the inlet to line 91. This will provide a desirable flexibility in operation, whether for breakdown, or where the unit is to be operated by other fuel means than coal. Such other fuel means will, of course, be oil or gas, which are normally used for starting and stand-by purposes.

The combustor unit 30 comprises an inner flame tube 31, and an outer cylindrical sheath 32. The flame tube is provided with radially spaced longitudinal fins 33 (Fig. 3) which coact with the outer tube 32 to provide a plurality of parallel ducts 34 extending the length of the tube and discharging directly into the fly-ash separator 50. The outer tube or sheath 32 is provided along its length with a plurality of spaced transverse fins or extended surfaces 35. The extended surfaces or fins 35 of the outer tube or sheath are centrally disposed in the regenerator casing or exhaust stack 21 of the gas turbine 20. Because of this disposition, the combustor unit is placed in direct heat-exchanging relation with the products of combustion or exhaust gases of the turbine. The inner flame tube 31 is open at its discharge end, as shown in Fig. 1, and closed at the opposite end by a cap or cover 36. Closure or cap member 36 will receive the fuel supply pipe 91 to introduce pulverulent fuel containing a substantial proportion of solid residue into the flame tube in a pressurized, air-borne stream. The cap 36 is provided further with a fluid-fuel inlet tube 37 for introducing liquid or gaseous fuel for starting the turbine, and a second fuel pipe 38 is provided for the introduction of a liquid or gaseous fuel to serve as a pilot light or igniter for the system. A sight tube 39 is also provided adjacent the flame area to permit inspection thereof. For remote inspection and control, the sight tube may be incorporated in a suitable alarm system. A photoelectric cell, or other flame-and-heat-responsive device may be connected thereto, suitable connections to the instrument board of the system being provided.

The fuel delivered into the flame tube, through coal atomizer 90, will be combusted in the flame tube, and the products of combustion will be discharged into and diluted in the upper mixing chamber 52 of fly-ash separator 50 by the extra, relatively cool air delivered through ducts 34 of the combustor casing.

The fly-ash separator 50 comprises a generally cylindrical body portion mounted on a base 51. A top plenum chamber 52 is closed off by a cover 53 which is normally welded to the unit. As more specifically shown and claimed in my application Serial No. 746,818, filed May 8, 1947, for Powdered fuel combustion apparatus, the plenum or mixing chamber opens into a conical chamber formed by an outer conical member 54, secured by flanged ring 55 to the wall of the member 50, an inner cylinder 56 secured at the bottom to the conical wall 54, and a removable cap or cover 57 is provided to close off the top of the inner cylinder. The cover 57 may be raised and lowered in place by any suitable mechanism, such as a power piston, indicated generally at 58. A plurality of radially arranged separator tubes 59, or miniature cyclone separators, are mounted in and between the members 54 and 56 in such a manner as to discharge separated fly ash to the inner fly ash receiving chamber 56' of the cylinder, and thence to the bottom of the container 50, while the cleaned air is delivered into chamber 54', and thence to the turbine through the ports or ducts 22 and 23.

The novel power units comprising a gas turbine and a combustor mounted in heat-exchanging relation with the exhaust gases of the turbine are more specifically described and claimed in my application Serial No. 746,817, filed May 8, 1947, for Self-contained gas-turbine system, and will not be described further herein.

The turbine casing and exhaust stack 21 will be required to be lagged, as indicated at 24. The fly-ash separator casing 50 normally will be lagged, or preferably internally-insulated.

It is to be noted that, due to the special mounting of the combustor in the exhaust stack in heat-exchange relation with the exhaust gases, and, due to the special arrangement of the extended heating surfaces exteriorly and interiorly of the member, a minimum temperature differential is set up and established between the outer tube of the combustor and the ambient exhaust gases. Because of this, and because of the high cooling effect of the forced air flow through the longitudinal ducts formed between the flame tube and the outer shell, the metallurgical requirements of the metals used are relatively simple and carbon steels can be used to advantage. This does away with the use of the more costly heat-resistant alloys, which are not as susceptible of ready fabrication as is carbon steel.

The heater tube banks disposed in the exhaust stack are arranged for one-way passage of fluid therethrough, as illustrated.

Figure 2:
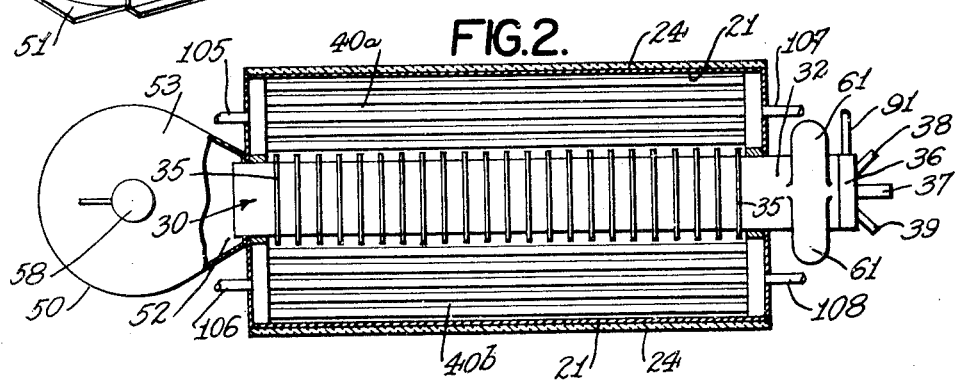
Fig. 2 is a top plan view of a combustion unit and auxiliary heaters of the system shown in Fig. 1.
Figure 3:
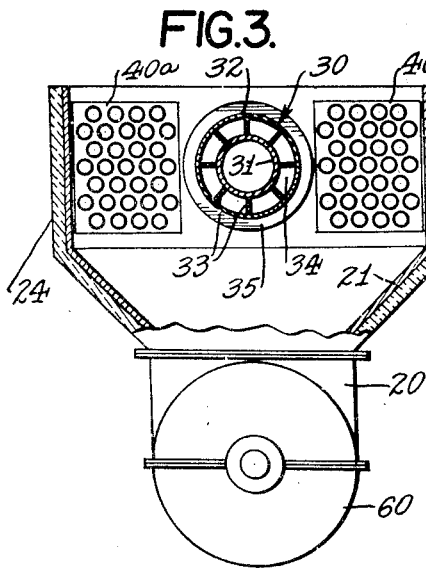
Fig. 3 is a transverse vertical section through the unit of Figs. 1 and 2 showing a central combustor tube and lateral heater tube sheets.

In Figs. 1, 2 and 3, the horizontally mounted tube banks 40 are severally identified as 40a and 40b. In the arrangement illustrated in Fig. 4, in addition to the lateral banks, the superjacent and subjacent banks of tubes are severally designated 40c and 40d.

Referring now to Fig. 5, the bank arrangement illustrated in Figs. 1, 2 and 3, is shown as utilized to supply wet steam to a drum 100. The drum 100 will be provided with spaced outlet pipes 101, 102, severally feeding pumps 103, 104. The pumps 103, 104 will feed into the tube banks 40a and 40b through lines 105, 106. The tube banks 40a and 40b will discharge into the drum 100 through pipes 107, 108 respectively, the said pipes being tapped into the drum at the top thereof. The steam discharge line 109 will lead from the drum to any suitable point of utilization, such as a heating plant or a process unit or power plant using steam.

Figure 4:
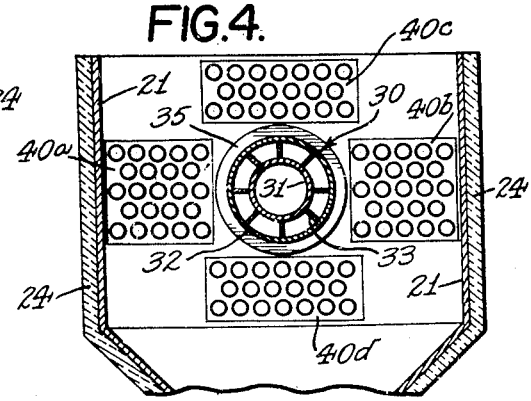
Fig. 4 is a view similar to Fig. 3 and showing four banks of tubes disposed about the combustor tube.

The system illustrated in Fig. 4 is susceptible of a variety of combinations for various purposes. As shown in Fig. 6, one of these combinations is directed to the generation of superheated steam. The system illustrated in Fig. 6, and utilizing the tube bank arrangement of Fig. 4, will be seen to comprise essentially a drum 125 fed by a bottom feed line 126, controlled by a float operated valve 127, connected to a suitable water-level control device 128. The discharge line 130, located at the bottom of the drum, feeds pump 131, which forces water through line 132 into and through the top pre-heater or tube-bank 40c. The pre-heated water and/or steam is discharged through outlet 133 and branch pipes 134, 134' to the laterally disposed tube-banks 40a and 40b. Branch pipes 135, 135' connect the tube-banks to a common outlet or delivery pipe 136, which discharges into the drum 125 adjacent the top thereof. A baffle 129 is provided in the drum adjacent the inlet or pipe 136 and deflects the steam entering through line 136 from direct passage into the inlet of line 137, which connects the top of the drum to the lowermost tube-bank 40d. The latter is provided with an outlet pipe 138, which will be connected to any suitable device. In this system it will be seen that the tube-bank 40c, being located at the top of the stack and above the combustor tube, will receive the least amount of heat. The lateral banks 40a and 40b will be more highly heated, so that the pre-heated water from the top bank will be converted into steam therein. The product delivered from the intermediate heaters to the drum will be wet steam, which, fed into the lowermost bank of tubes 40d, which is directly exposed to the exhaust gases from the turbine, will be heated to the highest possible degree, and the steam therein will be essentially super-heated.

In the system illustrated in Fig. 7, the quadruple banks of tubes are coupled to provide a supply of hot fluid, such as water, at uniform outlet temperature to a common discharge point, in spite of the differential heating of the several banks of coils resulting from their specific and special orientation in the exhaust stack of the gas turbine. In this system, a tank 150 is provided with inlet 151, controlled by float-operated valve 152, which, in turn, is controlled by water-level control device 153. The water from the tank is discharged through pump 154 and pipe 155 into header 156. The water is delivered from the header simultaneously to the four tube banks 40a, 40b, 40c, and 40d. The tube banks are tapped into a common outlet header 157 having a common delivery line 158. Because of the differential heating capacity of the several tube banks, suitable hand valves or other control devices, designated generally by the number 159, will be incorporated in the inlets to the tube banks. With this arrangement, it will be appreciated that the product delivered to the discharge pipe 158 will be of uniform temperature.

In the preferred arrangement, there is shown the direct mounting of both the combustor and the auxiliary heater banks or tube sheets in the exhaust stack of the turbine. As illustrated, this mounting is so effected that the turbine exhaust gases discharge directly into a superjacent stack in which the combustor and the heater tube banks are mounted.

However, in certain cases, if it is found desirable or necessary, the tube banks of the heater units and the combustor, or merely the heater units alone, may be mounted in the exhaust stack which is not superjacent the turbine. It is comprehended, therefore, within the scope of the present invention, to mount the combustor and the auxiliary heater units or tube banks, in the exhaust stack wherever and however it is positioned and oriented. Thus, if a downwardly directed exhaust stack is utilized, the combustor and the tube banks will be suitably mounted therein, as they may be mounted in any laterally or angularly disposed exhaust stack.

It will now be seen that there has been provided a novel combination power and heater unit system. The essential feature of the invention herein will be seen to comprise the initial development of power in a gas-turbine, and the utilization of the gaseous motive fluid, exhausted from the power units, for the generation of steam and/or hot water. By the special mounting of the steam and hot water units in the exhaust stack, with or without the mounting of the combustor unit therein and therebetween, the present system affords high utility and economy of space and operation with a maximum utilization of available heat units in the highly heated exhaust gases before discharge or venting to the atmosphere.

By placing the combustion chamber within the exhaust housing, and providing a heat exchange relationship between the outer pressure shell of the combustor and the exhaust gases, it is possible to utilize ordinary carbon steel in the said shell, and at the same time to dispense with insulation of the shell. The cooling air flowing between the pressure shell and the flame tube serves to keep both at a relatively low temperature, so that heat will actually be gained instead of lost through the outer shell of the combustor.

What is claimed is:

1. A combination power plant and auxiliary heating system comprising, in combination, a gas turbine, an electric generator and an air compressor driven by the turbine, a second air compressor driven by the turbine, means for generating heated expansible motive fluid comprising a combustor unit having a central combustion chamber and an outer shell discharging through a common feed line to the turbine; means for supplying fluidized fuel and combustion air from the second compressor to the combustion chamber, and cooling air to the said outer shell, an exhaust stack for the turbine mounting the combustor unit in heat-exchanging relation with the hot exhaust fluid, and tube boilers mounted in the stack in heat-exchanging relation with the hot exhaust gases.

2. A generating electric power plant comprising a turbo-generator, mechanical power take off means from the turbine shaft, a source of motive fluids for the turbine comprising a combustor mounted in the exhaust stack of the turbine in heat-exchanging relation with the exhaust gases, boilers in the stack and in heat-exchanging relation with the exhaust gases of the turbine, means for feeding fluids to said boilers and withdrawing heated fluids and vapors, said turbo-generator, combustor and boilers forming a unitary structure.

3. A generating electric turbine power plant effective to simultaneously deliver mechanical energy, electric energy, hot water, process steam, superheated steam, low pressure air of varying temperature, high pressure air of varying temperature, and heated aeriform gases, comprising electric generating means coupled to and driven by a gas turbine, means for generating motive fluids for the turbine including a main air compressor, a combustor for fluidized solid particles of fuel, a second air compressor, means for delivering air from the second compressor to the combustor as a fluid carrier of a combustible, streaming entrainment of fluidized solid particles of fuel, said combustor and main compressor discharging into a common mixing and fly-ash separating device to form a heated motive fluid for the turbine, means for delivering heated motive fluid to the turbine, an exhaust stack for the turbine, the combustor being mounted in the stack in heat-exchanging relation with the exhaust gases, boiler tubes also mounted in the stack in heat-exchanging relation with the exhaust gases, and means for feeding water, wet steam and the like to the tubes and selectively recovering hot water, process steam, and superheated steam.

4. Power plant according to claim 3, characterized by the fact that the means for delivering air-borne fluidized solid particles of fuel to the combustor incorporates a pneumatic expansion pulverizing means in advance of the combustor.

5. Power plant according to claim 3 characterized by the fact that the boiler tubes for generating superheated steam, process steam, and hot water, are respectively mounted in the exhaust stack in heat exchanging relation with exhaust gases of respectively decreasing temperature.

6. In a combination power plant and auxiliary steam and hot water heating system powered by heated expansible motive fluid, a power device for using the motive fluid, and having an exhaust stack, a combustor unit in the stack, an auxiliary steam and hot water heating system comprising a water supply means, and fluid carrying tubes in the stack circumferentially disposed about the combustor, and inlet and outlet control means for the tubes, the fluid carrying tubes and the combustor being in heat-exchanging relation with the exhaust gases.

7. System according to the claim 6 in which the fluid carrying tubes are mounted on opposite sides of the combustor.

8. System according to claim 7 in which at least two banks of fluid carrying tubes are severally mounted above and below the combustor.

9. System according to claim 6 in which at least four banks of tubes are mounted in aligned pairs about the combustor.

10. In a system, according to claim 1, water supply means, a combination storage tank and preheater, valve means connecting the water supply and the tank, means connecting the combination storage tank and preheater with the tube banks in a first preheating stage, means connecting said preheating stage with at least one middle tube bank, a return connecting the middle bank and the top of the tank, and conduit means connecting said tank and said lowermost tube bank.

11. In a system according to claim 6, a water storage tank, common feed means from the tank to all of said tube banks, and common discharge means for said tube banks.

12. In a system according to claim 6, differential valve controls in said common feed means to said tube banks.

JOHN I. YELLOTT.

REFERENCES CITED

The following references are of record in the file of this patent:

UNITED STATES PATENTS

| Number | Name | Date |
|---|---|---|
| 1,948,539 | Noack | Feb. 27, 1934 |
| 2,076,382 | Minton | Apr. 6, 1937 |
| 2,152,479 | Hoffmann | Mar. 28, 1939 |
| 2,192,759 | Stubbs | Mar. 5, 1940 |
| 2,193,114 | Seippel | Mar. 12, 1940 |
| 2,263,705 | Seippel | Nov. 25, 1941 |
| 2,452,581 | Lehmann | Nov. 2, 1948 |

Certificate of Correction

Patent No. 2,491,434 December 13, 1949

JOHN I. YELLOTT

It is hereby certified that errors appear in the printed specification of the above numbered patent requiring correction as follows:

Column 8, line 22, for the claim reference numeral "1" read 6; line 33, for "6" read 10; line 37, for "6" read 11;

and that the said Letters Patent should be read with these corrections therein that the same may conform to the record of the case in the Patent Office.

Signed and sealed this 6th day of June, A. D. 1950.

[SEAL]

THOMAS F. MURPHY,
*Assistant Commissioner of Patents.*